Figures 1, 2:
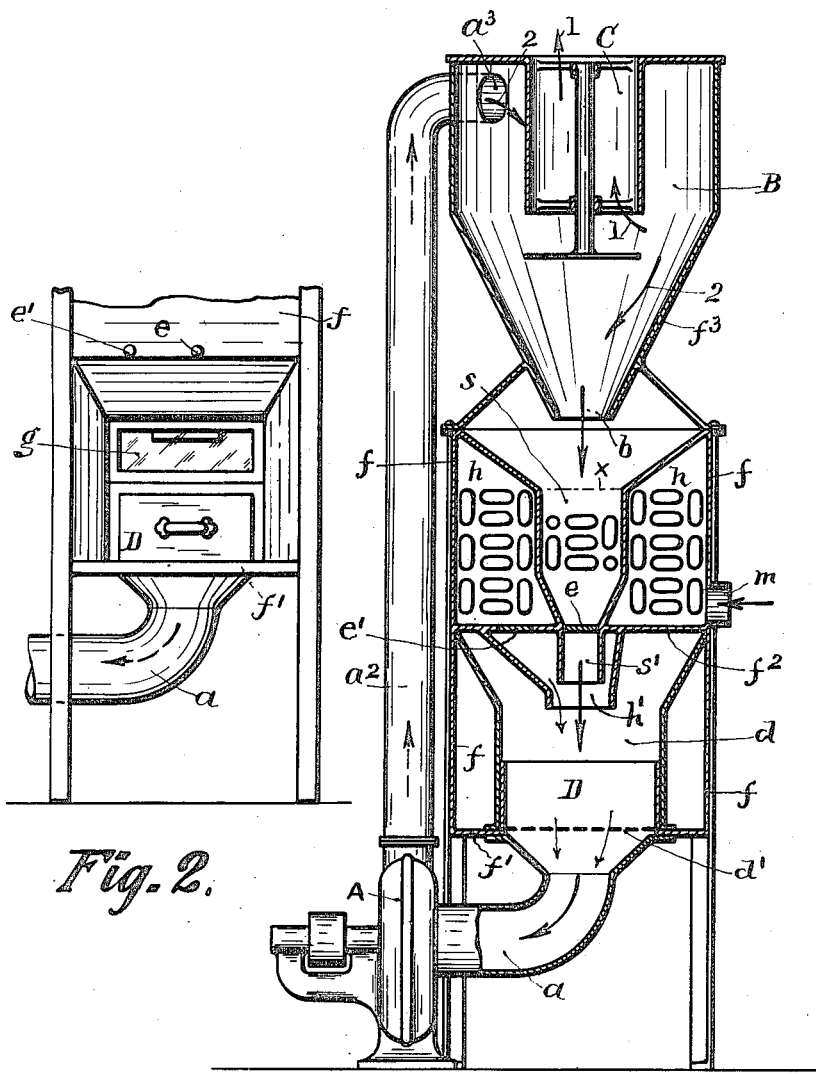

F. P. BOLAND.
PROCESS OF DRYING JEWELRY.
APPLICATION FILED APR. 10, 1915.

1,154,167.

Patented Sept. 21, 1915.

Witnesses,
Walter F. Fanning.
Charles G. Remington.

Inventor,
FRANCIS P. BOLAND.
By Geo. H. Remington.
Attorney.

UNITED STATES PATENT OFFICE.

FRANCIS P. BOLAND, OF PROVIDENCE, RHODE ISLAND.

PROCESS OF DRYING JEWELRY.

1,154,167.  Specification of Letters Patent.  Patented Sept. 21, 1915.

Application filed April 10, 1915. Serial No. 20,544.

*To all whom it may concern:*

Be it known that I, FRANCIS P. BOLAND, a citizen of the United States, residing at Providence, in the county of Providence and State of Rhode Island, have invented certain new and useful Improvements in Processes of Drying Jewelry, of which the following is a specification.

My invention relates to an improved process of absorbing moisture from the surfaces of suitably mounted articles of jewelry and other like goods, thereby leaving the same in a clean, dry condition, and it consists in subjecting the mounted articles to continuously moving absorbent and drying matter, substantially as set forth and claimed.

In the accompanying drawing, illustrating a self-contained machine or apparatus adapted to be employed in carrying out my improved moisture-absorbing process, Figure 1 is a central, sectional view, taken vertically through the machine, and Fig. 2 is a partial front elevation, the suction or circulating means being omitted.

The casing $f$ may have a rectangular form substantially air-tight and provided with a chamber $d$ having a suitable removable drawer or work-holder D positioned therein; the drawer having a perforated bottom $d^1$.

A suitable heating chamber $h$ is separated from chamber $d$ by means of a horizontal partition $f^2$ from which extends a depending nozzle or spout $h^1$ communicating with the chamber $h$ by means of a valve or gate $e^1$. An inlet $m$ admits outer air to chamber $h$. A main central heating and drying chamber $s$ is inclosed within the inner walls of said heating chamber $h$, and having the lower portion of chamber $s$ reduced in area and also provided at the bottom with a controlled valve or gate $e$, the latter, when open, being adapted to communicate with the chamber $s$ and the annular delivery spout $s^1$ so as to permit the moving absorbent matter to drop through the lower end of the open mixing chamber $h^1$ and fall direct into the work drawer D positioned therebelow.

The upper walls of chamber $s$ are inclined and secured to the reversely tapering side walls $f^3$ of the main exhaust or discharge chamber B, in open communication with the chamber $s$. The exhaust chamber is provided with a downwardly extending central tubular member C, open at each end, and of comparatively large area cross-sectionally. The lower end $b$ of the walls of the chamber B is reduced in diameter and extends into the chamber $s$, whereby the heavier particles of absorbent material fall to the bottom.

I may use a driven suitable vacuum or exhaust fan, so-called, as A, for circulating the air and absorbent matter employed in connection with my improved process. That is to say, a tube or duct $a$ is connected air-tight with the bottom of the drawer or container D and with the intake side of the fan A, from which latter the exhausted matter or material is discharged, via the pipe $a^2$, into the upper portion of chamber B, at $a^3$; the heavier or moisture-laden absorbent matter falls by gravity into the main heating chamber $s$, as before stated (see arrows 2). The heated vapor rising from the absorbent passes upward through the enlarged open tube C into the outer air (see arrows 1).

The device is constructed and arranged to give a whirling effect to the air and moisture-laden absorbent matter as they are discharged tangentially from the outlet end $a^3$ of the said pipe $a^2$.

The flow of absorbent matter through the chamber $s$ is or may be controlled or regulated, manually, by means of a gate $e$, while the gate $e^1$ performs a like office in admitting hot air from chamber $h$ to mingle with the then dry, hot absorbent as it passes through the nozzle $h^1$ to engage the articles contained in the drawer D.

Atmospheric air is received and heated in the chamber $h$, while the more or less moisture-charged used air discharged from the outlet $a^3$ into chamber B rises from the latter and is dissipated into the atmosphere via opening C.

In carrying out my improved moisture absorbing and drying process I subject the moving particles of absorbent to the continuous action of suction or inspiration so as to induce an uninterrupted current or flow of the absorbent matter through the articles contained in a suitably mounted vessel having a perforated or reticulated bottom, as distinguished from forcibly blowing the absorbent through or between the articles, which latter method I have found to be inefficient and impractical for the purpose.

In my improved process a continuously heated main chamber $s$ is employed, containing an initial quantity of heated dry absorbent matter, as particles of sawdust. Upon placing in a chamber $d$ a receptacle containing the moist articles to be treated, and at substantially the same time starting the apparatus and opening the gate e a circulation is established which causes the controlled moving hot absorbent matter to engage surfaces of the said moist articles and become more or less moisture-laden thereby, the suction-producing means at the same time withdrawing the absorbent matter from the work-holding receptacle and discharging it into a heating chamber which evaporates the moisture from the absorbent.

The following describes the operation of my improved process:—The particles of moisture-laden absorbent medium drawn or sucked through the articles under treatment are discharged in a continuous manner into a heated chamber, in which the temperature evaporates the moisture, thereby heating and drying the absorbent while it is moving by gravity through the chamber to again engage the articles in the container and absorb more or less moisture from them. It is desired to make clear the fact that in my improved process the several steps or sub-operations thereof are taking place simultaneously in a continuous manner, and do not follow one another in a series of independent operations following one another at regular or fixed intervals.

New or fresh absorbent matter may be supplied from time to time, as occasion requires, to replace that caused by loss, etc. The normally varying mass of the absorbent in the main chamber s may be kept substantially at the level x, as may be ascertained by the rate of flow observed through the glass panel g. Atmospheric air may be supplied to the heating chamber h to mingle with the absorbent in the mixing chamber $h^1$ to facilitate circulation of the absorbent.

It may be stated that the expression "absorbent matter sucked or drawn through the articles," or other analogous phrase used herein, does not mean that the said articles being treated are porous, but instead that the absorbent is drawn by suction through open interstices or spaces formed between the sides of adjacent articles. The relative amount of absorbent material employed, its character or fitness for the purpose required, and its rate of movement, together with the volume of air mingled with the absorbent and also its heating effect, may be varied or changed at will, as determined by the judgment of the operator or person in charge, the latter obviously taking into consideration the kind, condition, and character of the articles or goods submitted to the drying operation.

In some instances hot, dry, continuously circulating air alone may be drawn through or between the moist articles mounted in the container, whereby the said air serves as the absorbent-medium to take up or absorb moisture from the articles; the thus moisture-charged air in such case being discharged directly into the outer air without reheating. At the same time new or fresh outer air is being continuously heated in its passage through the heating chamber h and through the chamber d containing the articles under treatment; the suction employed meantime causing the heated air to be drawn through the articles and absorb moisture from the latter, substantially as before stated.

I claim as my invention:—

1. The process of absorbing moisture from the surfaces of articles of jewelry and the like, which consists in placing the articles in a suitable container, continuously drawing or sucking moving dry absorbent medium through or between the articles in the container, so as to absorb or take up the moisture, discharging the said moisture-laden absorbent medium, evaporating the moisture from the continuously circulating absorbent medium, and finally removing the then dried articles from the container.

2. The process of continuously absorbing moisture from the surfaces of articles of jewelry and the like contained in a suitable receptacle, consisting in mechanically subjecting the articles to a current of heated, dry sawdust drawn or sucked through or between the articles to absorb the moisture, discharging the moisture-charged sawdust into a heating chamber, heating the moving, moisture-charged sawdust to evaporate moisture therefrom, continuously repeating said steps in a circulatory manner without interruption, and removing the then dried articles from the receptacle.

3. The process of absorbing moisture in a continuous manner from the surfaces of suitably mounted articles of jewelry and like goods, which consists in drawing or sucking heated, dry absorbent matter through or between the mounted moist articles to engage the latter and absorb the moisture therefrom, withdrawing the moisture-laden absorbent from the goods being acted upon, passing the moisture-charged absorbent through a heated chamber to evaporate said moisture therefrom, and mechanically drawing or sucking the re-heated, dry, absorbent matter, together with the heated auxiliary air, through or between the goods.

In testimony whereof I have affixed my signature in presence of two witnesses.

FRANCIS P. BOLAND.

Witnesses:
CHARLES C. REMINGTON,
GEO. H. REMINGTON.